Dec. 12, 1961   R. LEVI   3,012,714
APPARATUS FOR THE RESOLUTION OF DISTRIBUTION PROBLEMS
Filed April 15, 1957   6 Sheets-Sheet 1

Dec. 12, 1961  R. LEVI  3,012,714
APPARATUS FOR THE RESOLUTION OF DISTRIBUTION PROBLEMS
Filed April 15, 1957  6 Sheets-Sheet 2
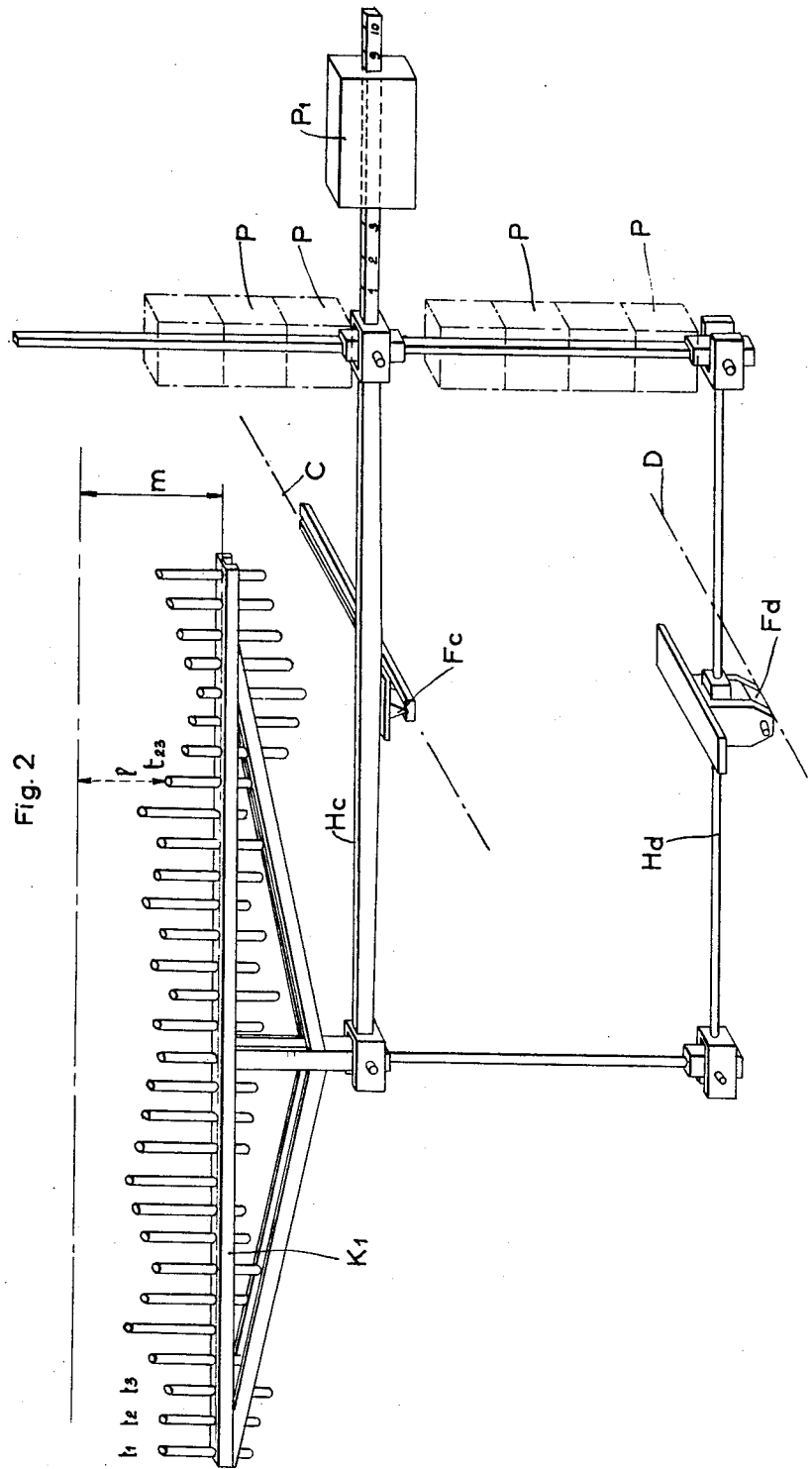

Dec. 12, 1961 R. LEVI 3,012,714
APPARATUS FOR THE RESOLUTION OF DISTRIBUTION PROBLEMS
Filed April 15, 1957 6 Sheets-Sheet 3
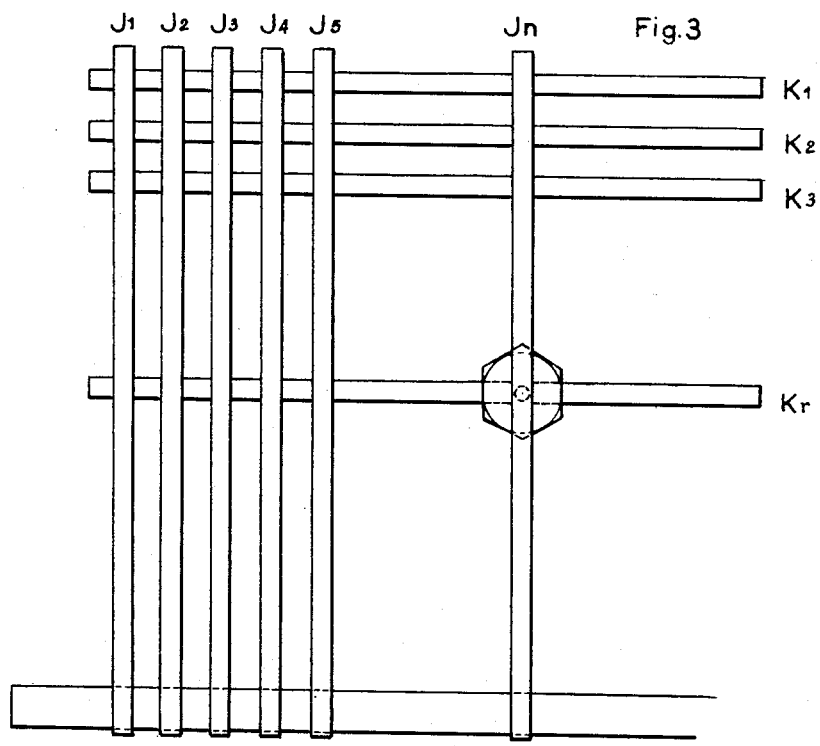
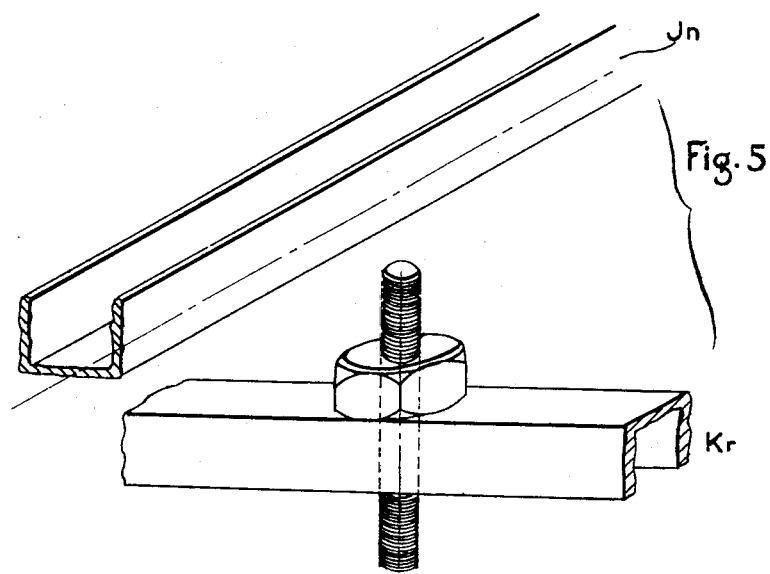

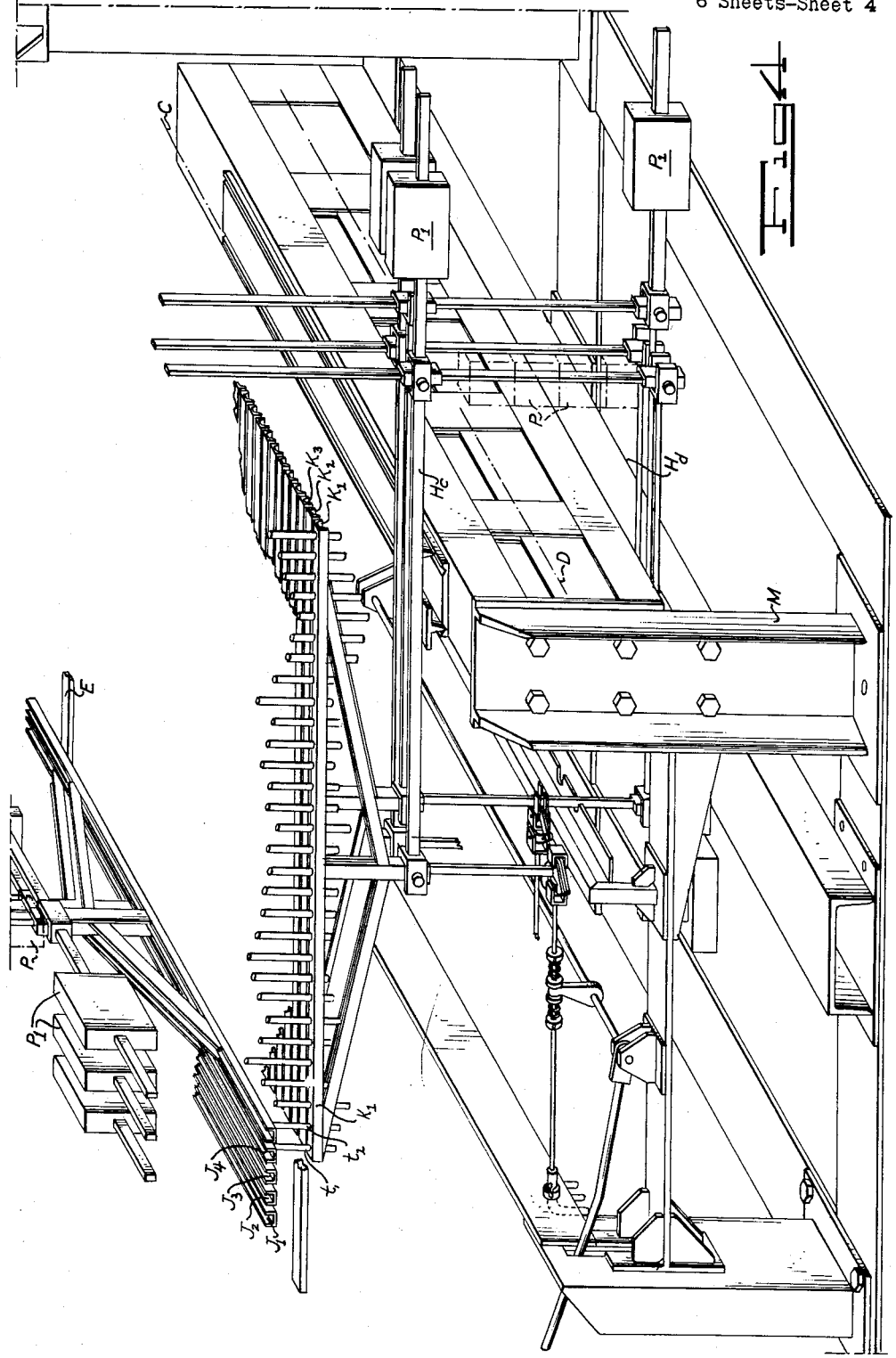

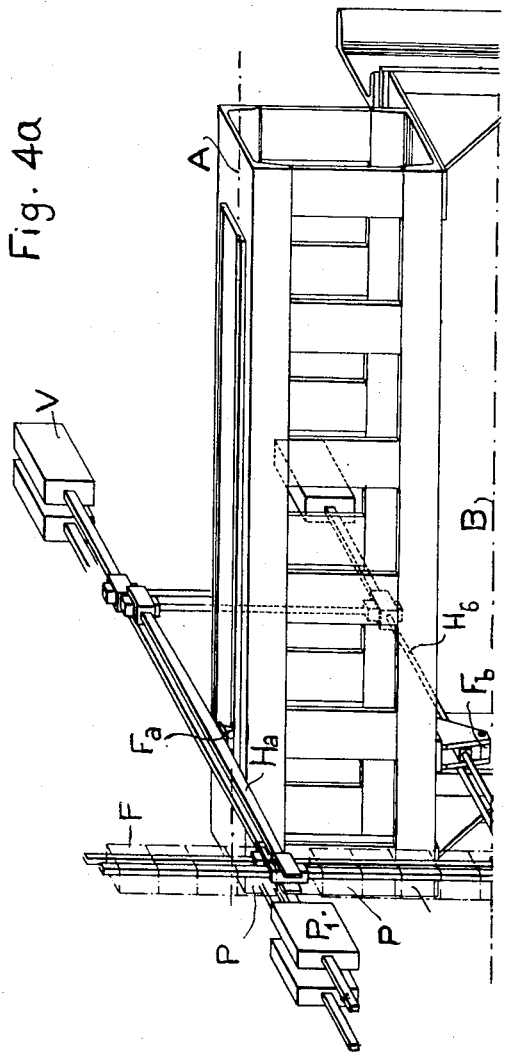

United States Patent Office 3,012,714
Patented Dec. 12, 1961

3,012,714
APPARATUS FOR THE RESOLUTION OF
DISTRIBUTION PROBLEMS
Robert Levi, 21 Rue d'Amsterdam, Paris, France
Filed Apr. 15, 1957, Ser. No. 652,964
Claims priority, application France Apr. 16, 1956
6 Claims. (Cl. 235—61)

This invention relates to apparatus for selecting relationships between groups of variables, and more particularly to apparatus for the resolution of distribution problems.

In practice, problems often arises which can be expressed algebraically by the condition that linear functions of unknowns or the unknowns themselves are either zero or positive but never negative.

This occurs, for instance, when it is required to select production centers which are to deliver identical objects to various consumption centers, and to determine how such objects shall be distributed to the various consumption centers in such a way that transport costs are as low as possible.

It is an object of this invention to resolve such problems by using a calculation table which solves such problems correctly without recourse to consecutive approximations, a feature not possible with conventional algebraic processes.

In the example under consideration, the generic term J will denote each production center and the generic term $k$ will denote each consumption center.

According to the underlying principle of the invention, a moving member which is normally in engagement with a stationary stop and which is urged towards the same by a force measuring the quantity $p^J$ available at J is associated with each production center J, while another moving member associated with each consumption center $k$ is urged in the opposite direction by a force measuring the quantity $c_k$ necessary at $k$, all the moving members J and $k$ being adapted to move in parallel directions and the arrangement being such that the free travel which an individual moving member associated with a center $k$ effects from a predetermined position until meeting an individual moving member associated with a center J and engaging with the stop thereof is measured by the unit transport cost $T_k{}^J$ between J and $k$, whichever centers $k$ and J are selected.

The calculating table therefore comprises a number of moving members J and associated stops, means of moving members $k$, a number of members, which can be fixed permanently, to reduce such free travel to the quantities $T_k{}^J$, and means such the forces which measure the quanties $P^J$ and $c_k$ can act upon the moving members J and $k$ in the aforesaid directions.

For a given system of quantities $p^J$ and $c_k$ marked consecutively in the table by the last-mentioned means, the moving members move and finally come to a standstill in a balanced state. The total work performed by the forces during such movement is directly proportional to total transport costs. The force which finally exists when any moving member J and any moving member K engage with one another measures the quantity $q_k{}^J$ which must be transported from J to $k$ is such total is to be a minimum.

The calculating table therefore gives a direct indication of the relationships which should be established between production centers and comsumption centers, such relationships being denoted by the fact that there is engagement between their associated moving members; the table also provides an indication of production centers whose resources are not wholly utilized, for the moving member of such centers is in engagement with the associated stop.

An embodiment of an apparatus forming a calculating table for reducing the costs of transport between a system of production centers and a system of consumption centers, the values $p^J$ and $c_k$ for all the centers being known at a predetermined instant, is illustrated by way of example and non-limitatively in the accompanying drawings, in which:

FIG. 2 is a perspective view of a moving $k$-term member with its associated elements;

FIG. 3 is a diagrammatic plan view of the lattice formed by the J-term moving members and the $k$-term moving members;

FIG. 4 is a partial perspective view of the apparatus;

FIG. 5 is a perspective view of an assembly detail, and

Figure 6:
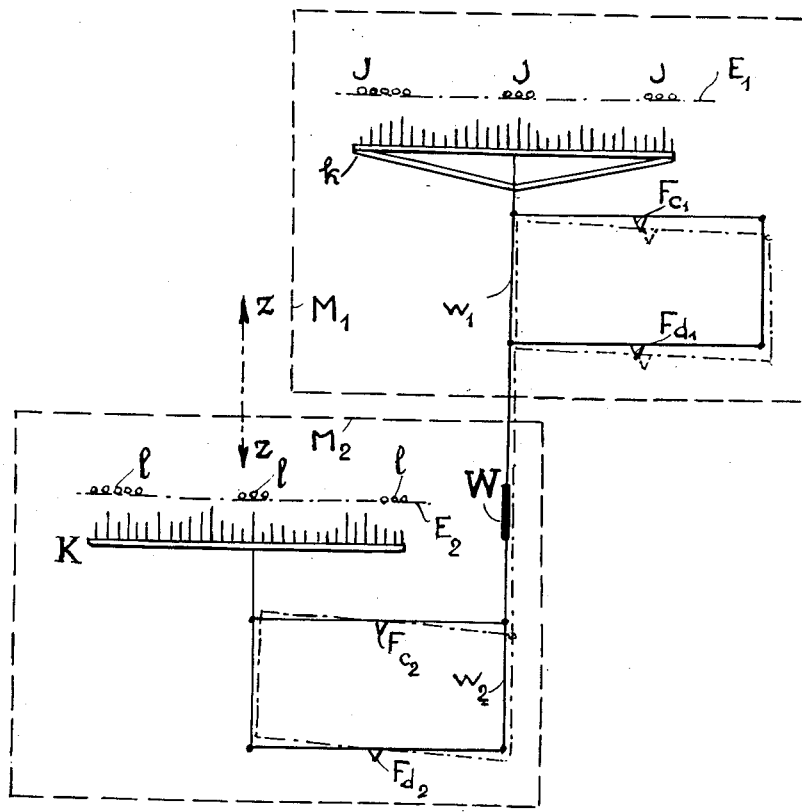

FIG. 6 diagrammatically illustrates a variant in which two calculating tables are combined to solve certain problems.

Referring to FIGS. 1 to 5, the apparatus comprises a framework M. The framework M comprises two horizontal parallel bearing lines A and B disposed one straight above the other and associated with the J-term members, while two other parallel and horizontal bearing lines C and D disposed one below the other and perpendicular to the lines A—B are provided for the K-term members. A horizontal stop line E prevents downward movement of the J-term members.

The group formed by any one of these members with its associated elements is equivalent to a Roberval balance, the blades $F_a$—$F_b$ and $F_c$—$F_d$ of which bear against the bearing lines A—B and C—D respectively.

The conventional horizontal bars $H_a$—$H_b$ and $H_c$—$H_d$ of this kind of balance are rigidly secured to the blades. Unit weights P, the sum of which is made up to the value $p^J$ or $c_k$ related to the center J or $k$ corresponding to the balance under consideration are threaded as required on a vertical rod disposed at one side of the apparatus, such rod being the equivalent of one of the balance plates. On the same side as the weights, one of the horizontal bars has a graduated extension on which an additional sliding weight $P_1$ can be moved to adjust to the fine values of $p^J$ or $c_k$.

The other plate of the Roberval balance is formed by a horizontal bar, as $J_1$—$J_2$ . . . $J_n$ . . . or $$K_1—K_2 \ldots K_r \ldots$$

this plate being on the same side as the weights P—$P_1$, in relation to the blades, for the J-term members and on the opposite side for the K-term members. The horizontal bars act, for each corresponding J-term center and for each corresponding $k$-term center, as moving members of the kind referred to at the beginning hereof to define the principle of the invention.

Screwthreaded rods $t_1$—$t_2$ . . . are fitted, in a manner to be described hereinafter, to the bars associated with the category which has no stop line, in this case, the bars K. These rods, due to their effective lengths, permit a relative precedence of engagement between bars J and K.

At the start of an operation, each sliding weight $P_1$ is at zero and there is no weight P on the apparatus, so that each balance, whether of the term J or of the term K, should be in equilibrium.

When seen in plan view, the bars J and K form a lattice (FIG. 3) such that the horizontal projection of any one bar J cuts the horizontal projection of any bar K, bearing in mind that, in the embodiment described, the bars J are disposed above the bar K.

In this embodiment the rows of screwthreaded rods $t_1$—$t_2$ . . . are fitted to each bar K straight below the various bars J. They are secured by screwing and locked by two nuts in a position such that each of them extends beyond the level of the bar K by a length equal to $m-T_k{}^J$, the length $m$ being chosen arbitrarily and $T_k{}^J$ denoting, as hereinbefore mentioned, the unit cost of transport from the center J to the center $k$. For instance, in FIG. 2 the length $l$ represents the unit cost of transport from the center $J_{23}$ to the center $k_1$.

Assuming that it is required, for instance, to carry, at minimum overall transport cost, articles available in the centers J to the consumption centers $k$ to suit the requirements of the latter, the apparatus operates as follows.

Availabilities and requirements are communicated to a distribution center. The operator of the apparatus then places on each individual balance the unit weights P and additional weights $P_1$ corresponding to the information received from each center. For instance, if each weight $P=10$ kg., it will be apparent (FIG. 1) that the center $J_2$ announces that it has $(9 \times 10)+3=93$ objects available and the center $k_1$ (FIG. 2) announces that it requires $(7 \times 10)+4=74$ articles.

When this marking is achieved, the system formed by the two groups of balances reaches a state of equilibrium.

This state of equilibrium is interpreted in the following way. When one bar J is raised from the bearing line by a single bar K, all the articles available at the center J are allocated to the center $k$ and the remainder of the latter's requirements is supplied by the centers corresponding to the other bars J which this same bar K touches or raises.

When one bar J is raised from the bearing line by $n$ bars K, $(n-1)$ of which are in engagement solely with the raised bar J, the center J serves all the requirements of the corresponding $(n-1)$ centers; the remaining articles available at the center J are allocated to the $n$th center $k$ and the remainder of the latter's requirements are supplied to it as in the preceding case.

If one bar J is touched but not raised by one or more bars K, the center J has supplies in excess of demand; the articles remaining after the requirements of the centers $k$ have been satisfied are measured by the weight which must be added to the group of the said bars K to raise the said bar J.

If several bars J are raised, the associated supply centers supply all of their articles to the demand. If, in addition, a further bar J is contacted but not raised, the associated center will supply less than all of its articles to the demand, the percentage being determined by weight necessarily added to the demand bars to raise said further bar J.

In practice, the screwthreaded rods $t$ can terminate in an insulated electrical conductor, the other end of which is associated with an electric light or other electric element to which voltage is supplied so that contacts produced mechanically between the bars of the two categories can be detected immediately.

Figure 1:
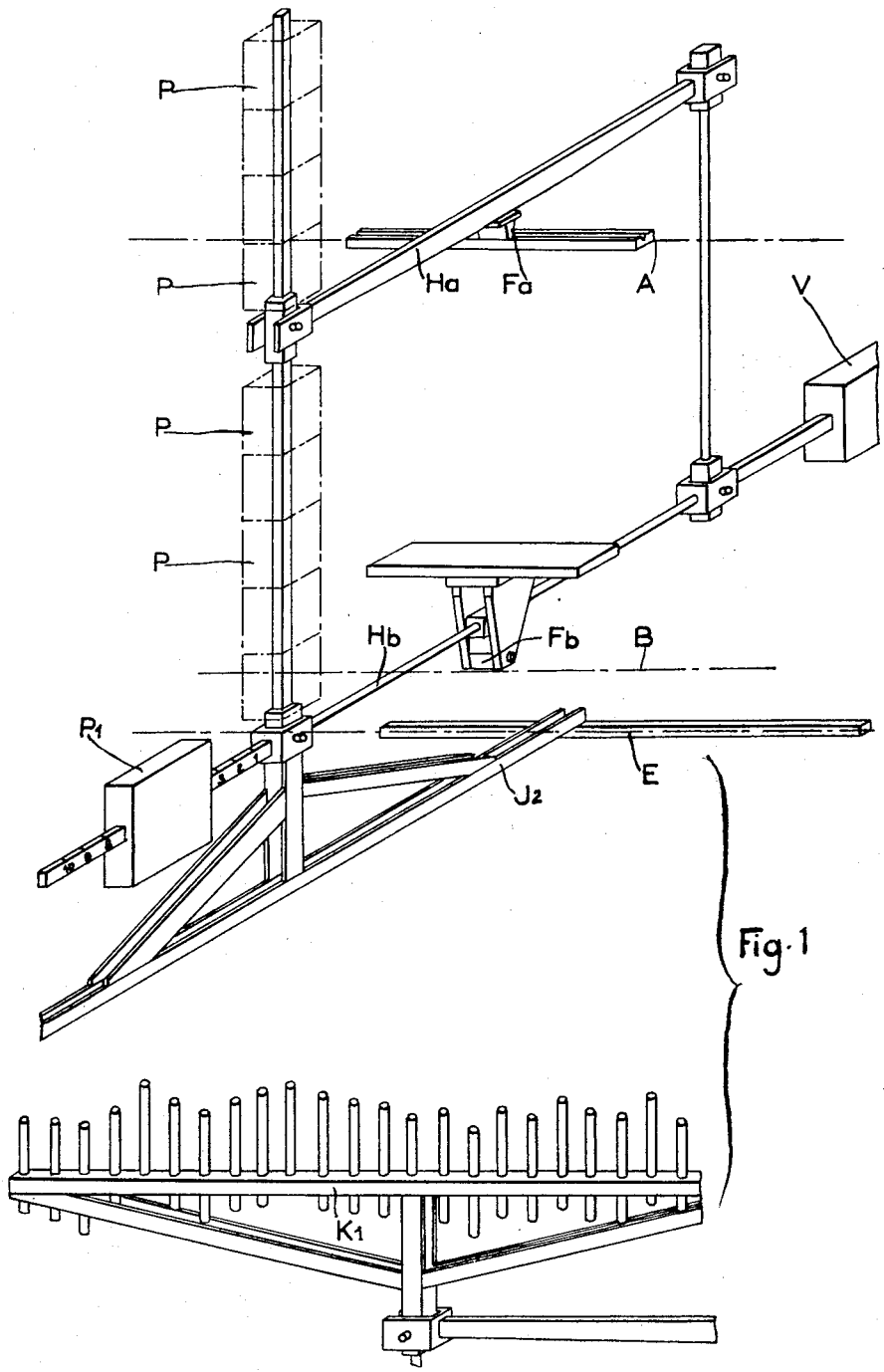
FIG. 1 is a perspective of the moving members associated with the terms J and $k$, in their relative position and with their associated elements.

In FIGS. 1 and 4 the reference V denotes a balancing counterweight for use when the apparatus is in the inoperative state.

Stated otherwise, in FIGURE 4 are a number of bars J which are associated, for example, with the production availability at a number of respective production centers. Bars J are operatively associated with a fulcrum or knife blade so that the bars J are pivotable as lever arms. Associated with each of the bars J are a number of variables or weights which are changeable or adjustable and indicate the amount of production available, or units available, at the various production centers. Bars J are, however, held in position by a stop E so that the moments operating through the bars J are retained as potential forces or moments rather than as kinetic forces or moments. As will next be indicated, demand forces or moments are applied against these potential forces or moments to provide a correlated assignment of production to demand.

Arranged transversely to the bars J are a series of bars K. These bars are associated with the requirements of various consumption centers. Bars K are pivotable about respective fulcrums and variables or weights P are positioned on the opposite sides of these fulcrums so as to urge bars K upwardly. The weight associated with each bar K indicates the demand at a particular consumption center. Since the forces resulting from these latter weights are unopposed except by bars J, these latter forces will be designated as kinetic forces.

Although the bars K are each arranged transversely to all of the bars J, the bars K do not make a common contact with the bars J upon rising vertically in response to the associated weight. Instead, each bar K is provided with a series of rods $t$, the rods $t$ being respectively aligned with the rods J. The rods $t$ extend varying distances from the bars K to the bars J. The bars K thus each engage the rods J (if at all) in a preference sequence determined by the height of the rods $t$. The height of the rods $t$ is inversely proportional to the transportation rates between the production and consumption centers. Thus, a bar K representing a consumption center, will first engage a bar J representing a production center, for which the transportation costs will be a minimum. It follows from FIGURE 4 that an entire network of production and consumption centers can be readily assigned to one another for transporting of production units at minimum cost.

More generally, the calculating table according to the invention, which is embodied by the apparatus just described or by any other device applying the same principle, helps to deal with all problems in which unknowns, which must be positive or zero, in this case the $q_k{}^J$, must follow linear equations or inequations, and to minimize a linear function of the $q_k{}^J$ which in this case is the sum of the products $q_k{}^J T_k{}^J$.

For instance, by a simple correction of the unit cost $T_k{}^J$ it is possible to deal with the problem of the minimum cost of articles supplied to various consumption centers when such articles are of equivalent use but are produced at different prices which vary with the origins.

Another kind of problem which the process according to the invention can help to resolve mechanically is that of the distribution of equivalent articles which are produced without being finished at different centers and which, prior to being supplied to consumption centers, have to be processed in different factories.

The reduction of transport costs to a minimum in the situation where intermediate processing is required is effected by combining two calculating tables of the type hereinbefore described and under the following conditions, which are diagrammatically illustrated in FIG. 6.

Moving members with the indices J and $l$ respecitvely, are allocated one each to the production centers and consumption centers, and two moving members $k$, K are allocated to each of the processing factories.

Frameworks $M_1$, $M_2$ of the tables can be moved relatively to one another and parallel with the direction in which the bars move relatively to the frames associated with the said bars. In the example illustrated in the drawings, the framework $M_1$ is lowered relatively to the framework $M_2$ and moves with it the blades $Fc_1$ and $Fd_1$ and the stop $E_1$ of the bars J.

The moving members $k$, K associated with a single processing factory are caused to move in the inverse sense of the same quantities. In the drawing, this is achieved by the presence of a connecting element W, for instance, a connecting rod, between the vertical rods associated with the balances $k$ and K respectively, but one of these rods $w_1$ has a moving member while the other rod $w_2$ bears a weight.

With the two frameworks in the starting position, the moving members J and $l$ are in engagement with their stop lines $E_1$, $E_2$. Due to the connection between balances $k$ and $K$, the weights applied to members $J$ and $l$ will be effectively opposed to one another.

The process is then as follows. The moving members $J$ and $l$ are affected by the action of forces $p^J$ and $c_1$—in this case weights—the forces $p^J$ measuring supplies of unfinished articles in the corresponding centers $J$ and the forces $c_1$ measuring the consumption of processed articles in the center $l$. The two tables are then moved progressively in the direction $Z$—$Z$ relatively to one another, so that some of the moving members $J$ and $l$ in engagement with their respective stops $E_1$, $E_2$ are obliged to disengage therefrom. This progressive displacement continues until all the moving members in either the $J$ or $l$ categories have been disengaged from their stop. If all the moving members $J$ are the first to become disengaged, it can be concluded that all the unfinished production has been absorbed, but if the moving members $l$ are the first to disengage, the consumption of processed articles is satisfied. In either of these states of the system, the forces transmitted by each of the connecting members W measure the quantities of articles which must be processed in the corresponding processing factories if total transport cost, which is also measured by the total work of the forces $p^J$ and $c$, is to be a minimum.

The embodiments hereinbefore described with reference to the accompanying drawings are not limitative. The calculating tables according to the invention can be embodied in a variety of ways. The moving members which in the examples hereinbefore described execute rectilinear motions, can execute circular motions around a single axis. In this case, the quantities $p^J$ and $c_1$ are not indicated by forces but by moments of forces.

What is claimed is:

1. Apparatus for selecting relationships between a first group of variables and a second group of variables, there being a preference sequence between each variable of one group and all the variables of the other group; said apparatus comprising a plurality of first means providing adjustable potential forces representing the variables of the first group, a plurality of second means each providing an adjustable kinetic force aligned to engage all of said potential forces in a direction to oppose the latter, and a plurality of third means on each said second means and in alignment with said first means and extending determinable distances towards said first means in accordance with the preference sequence whereby the first means are engaged in sequence until equilibrium is established, an engagement between the first and second means indicating a selected relationship therebetween.

2. Apparatus for selecting relationships between a first group of variables and a second group of variables, there being a preference sequence between each variable of one group and all the variables of the other group; said apparatus comprising a plurality of first means providing adjustable potential moments representing the variables of the first group, a plurality of second means each providing an adjustable kinetic moment aligned to engage all of said potential moments in a direction to oppose the latter, and a plurality of third means on each said second means and in alignment with said first means and extending determinable distances towards said first means in accordance with the preference sequence whereby the first means are engaged in sequence until equilibrium is established, an engagement between the first and second means indicating a selected relationship therebetween.

3. Selection apparatus comprising first means each respectively providing a potential force indicating separate supplies, second means each respectively providing a kinetic force indicating separate demands, said first and second means being operatively disposed with respect to each other so that each kinetic force is engageable with all of the potential forces in opposition to the latter, and means interposed between each second means and all of the first means to provide a preferred sequence of engagement between each second means and said first means, engagement of each second means with the first means with an equilibrium of the forces indicating preferred satisfying of the demand by the supply.

4. Apparatus as claimed in claim 3 wherein the first means are parallel balances including adjustable weights to represent supply and stop means to limit movement of the balances in response to the weights.

5. Apparatus as claimed in claim 4 wherein the second means are parallel balances transverse to the first said balances and including adjustable weights to represent demand.

6. Apparatus as claimed in claim 5 wherein the interposed means comprise extensions on the second said balances and extending in alignment with the first said balances determinable distances toward the latter for determining a preferred sequence of engagement between the balances.

References Cited in the file of this patent

UNITED STATES PATENTS 235,723     Auchincloss  _____ Dec. 21, 1880